United States Patent Office 3,749,591
Patented July 31, 1973

3,749,591
METHOD FOR FORMING A POLYSILOXANE IMPREGNATED POROUS SHEET AND ARTICLE THEREOF
Shibley A. Hider and Walter Kitaj, Toledo, and Robert E. Martin, Lakewood, Ohio, assignors to Owens-Illinois, Inc.
No Drawing. Continuation-in-part of application Ser. No. 834,606, June 10, 1969, now Patent No. 3,628,985, which is a continuation of abandoned application Ser. No. 503,760, Oct. 23, 1965. This application Dec. 11, 1970, Ser. No. 97,304
Int. Cl. B44d 1/094; C03c 25/02
U.S. Cl. 117—21                               24 Claims

ABSTRACT OF THE DISCLOSURE

A porous sheet is formed by first impregnating a fibrous web with about 2% to 99.75% of an organopolysiloxane and thereafter pressing said web and fully curing said siloxane to form a substantially nonporous sheet. Thereafter, the impregnated sheet is heated to the point at which at least a portion of the organic constituents present in the sheet, and especially in the siloxane, volatilize to leave a porous structure exhibiting good structural strength and other desirable physical properties.

CROSS-REFERENCE TO RELATED APPLICATIONS

This application is a continuation-in-part of copending application, Ser. No. 834,606, filed June 10, 1969 now U.S. Pat. No. 3,628,985, which, in turn, is a continuation of application, Ser. No. 503,760, filed Oct. 23, 1965, and now abandoned.

SPECIFICATION

This invention relates to porous sheets and methods of making same. More particularly, this invention relates to porous sheets comprised substantially of silica and methods of making such sheets by the volatilization of organic constituents therefrom.

A plethora of arts have long been desirous of using a porous fibrous sheet in one or more of their operations. For example, the art of filtering both gases and liquids has long been desirous of using and indeed, has used, a wide variety of porous structures for its purposes. As another example, the insulation art, and especially the high temperature insulation art, has long sought a versatile porous and flexible structure, which is both light-weight and useful for the intended purpose. As a further example, the catalyst art has long known of the value of porous sheets which either contain fibers that are themselves catalysts or have catalysts impregnated therein. In short, the utility of fibrous, porous sheets and other like structures is well established.

It is the purpose of this invention to provide the art with a unique porous structure, preferably in sheet form, which is versatile in that its physical and chemical characteristics may be varied over a wide range and which exhibits, in many instances, unexpectedly good structural strength.

In copending U.S. patent application, Ser. No. 834,606 (filed June 10, 1969), there is disclosed a method of formulating a fibrous sheet or other like structure which is impregnated with an organopolysiloxane resin. (The disclosure of this application is incorporated herein by reference.) The sheets formed when following the teachings of this copending application are substantially nonporous even when, as disclosed, the organic constituents are carbonized to render the sheets usable at high temperatures.

It has now been found, and thus it is a part of this invention, that if the sheets or other structures formulated in accordance with the teachings of this aforementioned copending application, are heated, or further heated, to a temperature sufficient not only to carbonize but, in addition, to volatilize and thereby remove at least a portion of the organic constituents from at least a portion of the organopolysiloxane in the sheet structure, the structure so formed, is porous and yet, in most instances, is structurally quite strong. Generally speaking, then, the structures of this invention are made by first formulating a fibrous impregnated sheet or other structure as taught by the aforementioned copending application wherein at least some of the fibers impregnated with the organopolysiloxane have a degradation point less than the volatilization point of the organic constituents in the organopolysiloxane. Thereafter, the structures so formed are heated to a sufficient temperature and for a sufficient period of time to volatilize some portion of the organic constituents at least in the organopolysiloxane to thereby obtain a structure of the desired porosity.

The term "carbonization" as used herein refers to the reduction of organic constituents to their charred, substantially carbon form. The term "degradation point" as used herein refers to that point at which the fibers tend to change both physically and chemically. For example, in the case of organic fibers, the degradation point is the point at which carbonization begins to occur. The term "volatilize" or "volatilization point" refers to the elimination by the application of heat of the organic constituents, usually in their charred or carbonized form, from the structure.

While it is clear that this invention is useful for the production of any shape or structure in which porosity is desired, a preferred embodiment is a porous sheet. Thus, for convenience, rather than by way of limitation, the detailed description of this invention which hereinafter follows, will refer to the production of a porous sheet, it being understood that other structures may also be formed by employment of these same teachings.

As disclosed in the above-cited copending application, the substantially non-porous sheet initially provided for use in this invention, is itself formed from a web of fibers manufactured by any of several methods conventional in the art. For example, the web can be formed from a slurry on a batch basis or in a continuous fashion, utilizing a machine such as a Fourdrinier paper-making machine. The only requirement necessary in the formation of the web is that the fibers must be present in such member and in such a way that there is adequate fiber-to-fiber contact to permit the formation of a rigid or semirigid web. Because the fibers are oriented in a single plane, the resulting impregnated sheet and the ultimate porous product is somewhat flexible.

As stated hereinabove, for the purposes of this invention, the fibrous web must be made up of at least some fibers which will not degrade when at least a portion of the organic constituents, at least in the organopolysiloxane, are volatilized from the system. Thus, the fibers contemplated may be either organic or inorganic or both, with at least some of the fibers, of whatever type, remaining undegraded after volatilization.

The amount of fiber remaining after volatilization and thus the amount of nondegrading fiber initially employed will vary over a wide range depending upon the type product ultimately desired. Generally speaking, the nondegrading fiber may be used in an amount of about 0.25-98% by weight of the impregnated web prior to carbonization and/or volatilization.

Preferably, the nondegradable fiber is inorganic. Examples of inorganic fibers useful in this invention include glass, quartz, asbestos, titanium dioxide, aluminum oxide, iron, copper, brass, aluminum, stainless, steel, magnesium, titanium and the like. Silica glass fibers, and particularly borosilicate glass fibers, are most preferred.

While all of the fibers employed may be nondegradable, it is preferred, for the purposes of this invention, to include at least some fibers, usually organic, which carbonize and volatilize along with the organopolysiloxane. Preferably, the amount of organic volatilizable fibers to inorganic nondegradable fibers is about 90–10% to 10–90% by weight respectively. Variance within as well as without this range will be dictated by the required properties of the ultimate product.

Examples of organic fibers useful in this invention include the many materials formed of cellulose. Cellulosic materials adapted for use in this invention include wood cellulose and pulps derived from hardwoods, softwoods, and woody annual plants such as balsam fir, eastern hemlock, jack pine, eastern white pine, red pine, black spruce, red spruce, white spruce, tamarack, cyprus, quaking aspen, American beech, paper birch, yellow birch, eastern cottonwood, sugar maple, silver maple, yellow poplar, black cherry, white oak, bagasse, hemp, cotton and jute; mixtures of cellulosic materials can also be used. Such materials are preferred for use as the volatilizable "fibers" of this invention.

When cellulosic type fibers are utilized, these fibers may be pretreated by soaking in water and solvent exchanged with anhydrous methyl alcohol in order to achieve a fiber that is more susceptible to impregnation. However, in a preferred technique, the web is prepared directly from an aqueous slurry without pretreatment and such a web is found readily impregnatable for the purposes of this invention.

Other examples of organic fibers include the many synthetic fibers conventional in the art. Examples of suitable synthetic fibers are those that are formed from both homopolymeric and copolymeric substances, such as (1) vinyl resins formed by the polymerization of vinyl halides or by the copolymerization of vinyl halides with unsaturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadienes and styrenes; (2) poly-$\alpha$-olefins such as polyethylene, polypropylene, polybutylene, polyisoprene and the like, including copolymers of poly-$\alpha$-olefins; (3) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethylene oxide; (9) polystyrene, including polymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde engendering substances such as paraformaldehyde; (13) modified and unmodified condensates of hydroxy benzenes like phenol, resorcinol, etc., with the aforementioned aldehydes; (14) silicones such as dimethyl and methyl hydrogen polysiloxanes; (15) unsaturated polyesters; and (16) cellulose esters including the nitrate, acetate, propionate, etc.

While any organopolysiloxane may be used in the practice of this invention to impregnate the fibrous web, a particularly preferred organopolysiloxane because of the good strength, porosity, and other characteristics which it produces in the final product is one formed by the hydrolysis and condensation of at least one compound embraced by Formula I (I) $\qquad T_nSiZ_{(4-n)}$ wherein T independently generally represents a member such as alkyl, alkenyl and aryl. More specifically, T is independently a member such as alkyl, e.g., methyl, ethyl and propyl through hexyl (both normal and isomeric forms), cyclophenyl, cyclohexyl, vinyl and the normal and isomeric forms of propenyl through hexenyl and phenyl.

Z independently generally represents a hydrolyzable group. More specifically, Z is independently a member such as halogen (chloride, bromine, fluorine, and iodine), alkoxy (e.g., methoxy through heptoxy), and acyloxy (e.g., acetoxy, propionoxy, butyroxy, pentanoxy, hexanoxy, etc.) and aryloxy, e.g., phenoxy;

$n$ represents a positive integer of less than 4, but is preferably one.

In Formula I, as given above for substituent Z, alkoxy groups are preferred because their hydrolysis products are less acidic, and therefore the silane condensation can be better controlled. Alkoxy groups of less than 5 carbon atoms are especially advantageous (and are preferred), because the rate of hydrolysis can be inconveniently low when the organic hydrolyzable radical(s) have higher molecular weight (i.e., more carbon atoms).

It will be understood, of course, by those skilled in the art that some or all of the Z's in Formula I can also represent an —OH group. Hence, the term "hydrolyzable" as used herein is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and the appended claims, are intended to include within their meaning the cohydrolysis and co-condensation products that result when mixtures of silicon-containing starting reactants are employed.

Preferred organosilane monomers adapted for use in this invention consist essentially of a compound represented by Formula II:

(II) 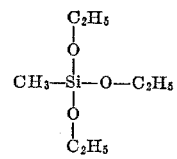

or a mixture of compounds as represented by Formulae III and IV

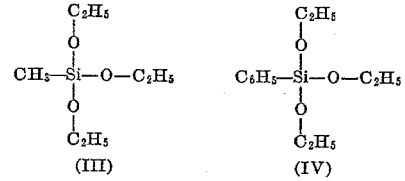

During the in situ hydrolysis and polymerization compounds III and IV link together to form a copolymer. The molar ratio of the compound as represented by Formula III to the compound as represented by Formula IV can be from 1:10 to 10:1 with a more preferred ratio being 1:5 to 5:1. A most preferred composition is produced by the hydrolysis and condensation of 2 moles of the compound as represented by Formula III with one mole of the compound as represented by Formula IV. Up to 10 mole percent but preferably up to 5 mole percent of diphenylsilanediol can be incorporated into the copolymer that is produced by the condensation of compounds as are represented by Formula III and IV by co-condensation.

In the subject invention at least one monomeric organosilane compound as is represented by Formula I, II, III and IV is converted into a solid organopolysiloxane compound by the following general procedure. The organosilane compound or compounds are hydrolyzed at a temperature of from about 50 to about 80° C. for a period of time of from about 1 to about 10 hours, in the presence of water and a hydrolysis catalyst like HCl. The temperature is then raised, e.g., to from about 100 to about 300° C., for a period of time of from about 1 to about 30 minutes to effect the removal of some by-product alcohol and excess water. This also effects the further condensation of the product. The organopolysiloxane after alcohol-water removal (e.g., 50–90 mole percent alcohol by-product and water) is then precured (partially cured) at a temperature of from about 90 to about 185° C. and below the gel point thereof for a period of time of from about 20 seconds to about 30 minutes. This precured product is solvent soluble and may be finally cured by heating between about 90 to about 200° C. for about 4 to about 168 hours.

During condensation, the above discussed organosilane compounds cross-link to form compounds that exhibit exceptional physical properties such as stability and hardness.

The composition and preparation of the monomeric organosilane compounds and their subsequent polymerization and copolymerization is fully discussed in U.S. Pat. Nos. 3,389,121 and 3,389,114. The disclosures of these patents are incorporated herein by reference.

The invention at hand is also adapted to utilize a thermoplastic powder form of the above described organopolysiloxane resins. These thermoplastic organopolysiloxane resins can be produced by the alteration of the above described partial curing step or by the alteration of the final curing step. More specifically, if the partial curing step is carried out at a temperature of from 10–20° C. below the gel point of the resin on cooling to room temperature, a solid thermoplastic resin results. Likewise, a thermoplastic resin will result when condensation and partial curing steps are carried out as described above, but the final cure is interrupted before complete polymerization is effected. These thermoplastic organipolysiloxane powdered resins are advantageous for the impregnation of the fibrous web due to their ease of application. The organopolysiloxane compounds used in this invention are soluble in such solvents as methanol, ethanol, butanol, acetone, ethyl acetate, benzene, xylene, toluene, ethylene glycol monomethyl ether, ethylene glycol monomethyl ether acetate, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc. However, it should be noted that after the desired article is shaped and the final cure is effected, these thermoplastic resins take on a thermoset condition.

Further, in accordance with the teachings of the aforementioned copending application, the fibrous web may be impregnated with one or more of the above-described organopolysiloxanes by using either a solid thermoplastic siloxane or a solvent solution of a siloxane. In those instances where the preferred organopolysiloxanes are used, they may be employed either in their precured form or the precuring may be effected after impregnation. That is to say, while it is sometimes preferable to precure after impregnation, it is most preferred because precuring can be easily effected in those facilities used to manufacture the basic organopolysiloxane, to precure prior to web contact and impregnation, and as a separate step in the actual manufacture of the resin. Thus, in one example and when a solvent solution, as the medium for dispersing the precured resin, is utilized, the web is impregnated with the solvent solution in a conventional manner, for example, by spraying, dipping, brushing, etc. Solvents as described above are suitable for use in this phase of the subject invention. After application of the precured organopolysiloxane compositions of this invention to the web, the solvent component is evaporated at a temperature of from about 25 to about 185° C. Following the removal of the solvent, the final curing is effected at a temperature of from about 80 to about 100° C. for a period of time of from about 8 to about 24 hours. A more preferred range of operating conditions is to evaporate the solvent and precure at a temperature of from about 130 to about 140° C., followed by a final cure at a temperature of from about 90 to about 100° C. for from about 8 to about 12 hours at 65 percent relative humidity. While a relative humidity of 65 percent is preferred, the curing can be carried out at any relative humidity of from about 5 to about 100 percent. During this curing sequence, pressure can also be applied. Pressures of from about 5 to about 600 p.s.i.g., can be utilized with a more preferred range being from about 150 to about 250 p.s.i.g.

The preformed fibrous web can likewise be coated by the application of a thermoplastic organopolysiloxane resin powder having a mesh size of 20 or less as described above. This thermoplastic organopolysiloxane resin is then driven into the web and the final cure effected by the application of at least one of heat and pressure.

Pressures of from about 50 to about 600 p.s.i.g. and temperatures of from about 15 to about 25° C., of from about one-fourth to about two hours are suitable for use in this phase of the subject invention. A more preferred range of operating conditions is at a temperature of from about 120 to about 175° C. at a pressure of from about 100 to about 300 p.s.i.g. for a period of time of from about 15 to about 30 minutes.

In regard to both of the above described curing processes, it could be stated that when high pressure and high temperature are utilized, a product having superior physical properties is produced. Example of these physical properties are ring crush and tensile strength.

The impregnated fibrous structure can comprise by weight from about 0.25 to about 98% fiber and from about 99.75 to about 2% organopolysiloxane resin. A more preferred range is from about 40 to about 60 percent fiber and from about 60 to about 40 percent organopolysiloxane resin. A most preferred structure comprises 50 percent of a fiber mixture which comprises 90 percent glass fiber and 10 percent kraft pulp and 50 percent of methyl-phenyl copolymer, as is described in reference to Formulae III and IV above. Prior to, during or subsequent to the final cure, the impregnated sheet can be shaped or otherwise formed into a finished article of the desired structural design. For example, the sheet can be corrugated, formed into a container or laminated prior to, during or subsequent to the final cure.

Once provided with the impregnated structure described hereinabove, one may render the structure porous by heating it to a sufficient temperature and for a sufficient period of time to volatilize at least a portion of the organic constituents at least in the polyorganosiloxane binder resin. Such a volatilization step may also include within it the final cure of the resin. However, it is preferred to fully cure the resin prior to volatilization.

While it is not exactly known what occurs during carbonization and volatilization of the organopolysiloxne, it is known that this at least partially volatilized resin provides a substantial inorganic silica structure which is porous and at the same time sufficiently strong to maintain the integrity of the structure as a whole. Generally speaking, the greater the volatilization, the greater the porosity and the lesser the strength.

Heating may take place in two separate steps, the first to carbonize, the second to volatilize. On the other hand, heating may be accomplished in one continuous step. The times and temperatures employed for these steps or step will, of course, vary, depending upon the type materials employed, the amount of porosity and strength required and the like. Because the subject invention finds unique applicability for the formation of porous structures used in environments employing very high temperatures, it is preferred to volatilize substantially all of the organic materials present in the initially provided web. For webs initially of about 10–20 mls. in thickness, times of about 1–10 hours at temperatures in excess of about 400° C. are usually sufficient to insure this preferred result. For example, in those instances where the organopolysiloxane employed is that formed from monomers illustrated in Formula II or Formulae III and IV, where the fibers are an admixture of inorganics such as glass, quartz and the like, with kraft pulp, and all constituents are employed in the above given preferred amounts, a heat cycle of about 1–3 hours at about 300° C. to carbonize, followed by 1–3 hours at about 500° C. to volatilize, is found sufficient to form a strong porous sheet substantially free of organic constituents. Alternatively, 2–8 hours at about 500° C. with a 1–2 hour heat-up time, is also found sufficient. Times may, of course, be decreased by increasing the temperatures employed. Generally speaking, the upper limit of the temperatures employed is usually considered to be the degradation point of the fibers (e.g., the softening point of the glass fibers).

It is within the purview of this invention to add to the system described compatible materials which do not affect the basic and novel characteristics of the composition of this invention and which, if intended to be a part of the ultimate porous product, will not be degraded during volatilization. Examples of such materials includue catalysts to be released during use of the porous structure, coloring agents, such as dyes and pigments, fillers, anti-oxidants, antistatic agents, stabilizers and anti-foaming agents. The upper limit of the quantity of such additives is usually about 55% by weight of the ultimate product formed.

As stated hereinabove, porosity and strength may be varied by varying such parameters as the size and type of fibers employed, the amounts of ingredients used, and the times and temperatures employed in the volatilization step. As further stated, the structures of this invention may be formed so as to be useful in high temperature environments. Thus, if high temperature environments are to be experienced, the times and temperatures of the volatilization step are substantially set since they must be sufficient to volatilize substantially all of the organic constituents present. The other parameters must therefore be considered the primary ones as to the ability to vary porosity.

The following examples, in addition to illustrating several embodiments of this invention, also illustrate how various parameters, other than time and temperature, may be employed to vary the porosity of the ultimate product.

EXAMPLE I (Preparation of organopolysiloxane solution)

A flaked solvent-soluble, further-curable organopolysiloxane was made from a mixture of methyltriethoxysilane and phenyltriethoxysilane in the manner set forth in Example I of U.S. Pat. No. 3,414,540. 300 grams of this organopolysiloxane were then dissolved in 886 ml. of acetone to form an impregnating resin solution.

EXAMPLE 2–7

Several sheets were formed by dipping a web of the indicated composition into the solution of Example 1 and treating it in the indicated manner. Volatilization was effected by heating the samples at 300° C. for one and one-half hours, at which time they were charred black, followed by raising the temperature to 500° C. and holding it at this temperature for about two hours until all carbonization was removed as evidenced by the sheets being almost white. Along with the reported sheets, various control sheets were run which contained no glass fibers. Such sheets were so brittle as to break up when touched, thus no data could be obtained therefrom. The pulp employed was kraft pine pulp and the glass fibers were conventional one-half inch beta glass fibers (OCF). The following table summarizes the data obtained.

TABLE I

| Example No. | Sheet No. | Percent glass fiber (borosilicate glass) | Percent pulp | Wt. glass fiber plus pulp, g. | Wt. glass fiber plus g. (a) | (b) | Percent pick-up (c) | (d) | Caliper of final product (thousandths of inch-mils) | Wt. glass fiber plus resin after volatilization g. | Porosity (sec.) | Average porosity |
|---|---|---|---|---|---|---|---|---|---|---|---|---|
| 2 | 1 | 10 | 90 | 9.25 | 12.1 | | 30.04 | | 13 | 3.3 | 1.7 | 1.7 |
| | 2 | 10 | 90 | 9.0 | 11.8 | | 31.10 | | 12 | 3.3 | 1.7 | |
| 3 | 1 | 25 | 75 | 7.9 | 12.08 | | 52.9 | 44.6 | 12 | 4.5 | 2.0 | 2.15 |
| | 2 | 25 | 75 | 7.5 | 11.56 | 10.94 | 54.2 | 45.9 | 12 | 4.8 | 2.3 | |
| 4 | 1 | 50 | 50 | 8.25 | 11.7 | 11.4 | 41.8 | 38.2 | 12 | 6.7 | 3.0 | 4.1 |
| | 2 | 50 | 50 | 7.98 | 10.9 | 10.7 | 36.6 | 34.1 | 11 | 6.1 | 5.2 | |
| 5 | 1 | 40 | 60 | 6.9 | 10.48 | 10.2 | 52.0 | 47.8 | 10 | 5.2 | 3.3 | 3.4 |
| | 2 | 40 | 60 | 7.1 | 10.45 | 10.28 | 47.3 | 44.8 | 11 | 5.4 | 3.5 | |
| 6 | 1 | 75 | 25 | 7.72 | 13.08 | 12.8 | 69.5 | 65.8 | 12 | 9.8 | 5.9 | 7.7 |
| | 2 | 75 | 25 | 9.06 | 14.6 | 14.32 | 61.2 | 58.1 | 14 | 10.9 | 9.4 | |
| 7 | 1 | 90 | 10 | 8.5 | 19.21 | 18.75 | 126.0 | 120.8 | 17.5 | 15.8 | 14.8 | 14.8 | a Weight glass fiber plus pulp plus resin after dipping and air drying.
b Weight glass fiber plus pulp plus resin after dipping and pressing for one-half hour at 300° F. at 270 lbs. pressure to effect final cure.
c Percent pick-up of resin on air-dried sheets.
d Percent pick-up of resin on sheets which were pressed one-half hr. at 300° F. at 270 lbs. pressure.
e Porosity was measured using a Gurley Porosity Tester in accordance with ASTM-D-726 and TAPPI T-460-05-68.

EXAMPLES 8–10

In order to illustrate how porosity can be varied by varying the fiber size, sheets were formulated and the porosity determined similarly as in Example No. 4 above. The results are reported in the following table:

TABLE II

| Example | Percent by cut | Fiber type | Final product caliper (thousandths of inch) | Porosity (sec.) |
|---|---|---|---|---|
| 8 | 50 / 50 | ¼″ beta glass / Kraft pine pulp | 11.5 | 2.4 |
| 9 | 50 / 50 | ¾″ beta glass / Kraft pine pulp | 12.5 | 1.4 |
| 10 | 50 / 50 | 1″ beta glass / Kraft pine pulp | 14.8 | 1.1 |

EXAMPLES 11–12

In order to illustrate how the type of fiber can be used to vary porosity, sheets were formulated and porosity determined similarly as in Example 4 above. The results are reported in the following table:

TABLE III

| Example | Percent by weight | Final product caliper (thousandths of inch) | Porosity (sec.) |
|---|---|---|---|
| 11 | 50 ½″ beta glass / 50 NSSC hardwood pulp | 15.5 | 1.6 |
| 12 | 50 ½″ beta glass / 50 Kraft pine pulp | 11.5 | 4.1 |

Especially suitable organopolysiloxanes for this invention are solvent-soluble, further curable organopolysiloxanes made by a process which comprises (a) heating (CH₃)Si(OR)₃ or (C₆H₅)Si(OR)₃ or mixtures thereof, wherein R is a $C_1$–$C_5$ alkyl with at least about 1.5 moles of water per mole of total silane in the presence of an effective catalytic amount of a hydrolysis catalyst, e.g., one or two to about 50 p.p.m. HCl at a temperature between ambient and reflux, preferably between about 50° C. and 90° C. for about 1 to about 10 hours, (b) concentrating the product of step (a) to remove some alkanol by-product and water, e.g., 50–90 mole percent alkanol by-product and some water and (c) precuring the concentrated product of step (b) by heating below the gel point thereof to produce a solvent-soluble, further-curable organopolysiloxane.

Once given the above disclosure, many other features, modifications, and improvements will become apparent to the skilled artisan. Such other features, modifications, and improvements are therefore considered to be a part of this invention, the scope of which being determined by the following claims.

We claim:

1. A method of forming a porous structure which comprises providing a fibrous web impregnated with a cured organopolysiloxane resin, said polysiloxane resin being an hydrolysis and condensation product of at least one organosiloxane monomer of the formula $$T_nSiZ_{(4-n)}$$

wherein T represents alkyl, alkenyl or aryl groups, wherein Z represents an hydrolyzable group and wherein $n$ represents integers 1, 2 or 3 wherein the impregnated fibrous web comprises by weight from about 2% to 99.75% organopolysiloxane resin, and heating said web at temperatures ranging from 300° C. to the degradation point of the fibers of the fibrous web so that at least a portion of the organic constituent of said organopolysiloxane resin is volatilized to render said fibrous web porous.

2. A method in accordance with claim 1 wherein the fibrous web comprises non-degrading fibers in an amount of about 0.25 to 98% by weight of said impregnated web.

3. A method in accordance with claim 2 wherein said fibers are comprised at least in part of fibers which do not degrade to any substantial degree during volatilization of the organic constituents.

4. A method in accordance with claim 3 wherein said fibers are further comprised of fibers which volatilize along with the organic constituents in said organopolysiloxane resin during said volatilization.

5. A method in accordance with claim 4 wherein said nondegrading fibers are inorganic fibers selected from the group consisting of glass, quartz, asbestos, titanium dioxide, aluminum oxide, iron, copper, brass, aluminum, stainless steel, magnesium, and titanium.

6. A method in accordance with claim 5 wherein said inorganic fibers are borosilicate glass.

7. A method in accordance with claim 4 wherein said volatilizable fibers are organic fibers.

8. A method in accordance with claim 7 wherein said organic fibers are comprised of cellulose.

9. A method in accordance with claim 8 wherein said organic fibers are kraft pine pulp.

10. A method in accordance with claim 4 wherein the nondegradable fibers are employed in an amount of 10–90% by weight of the total fiber content and the volatilizable fibers are employed in an amount of 90–10% by weight of the total fiber content.

11. A method in accordance with claim 1 wherein the fibers are in an amount of 60–40% by weight of the impregnated web and the organopolysiloxane is in an amount of 40–60% by weight of the impregnated web.

12. A method according to claim 1 wherein said fibrous web is comprised of 50% by weight of a fiber mixture of 90% by weight glass fiber and 10% by weight kraft pulp, and 50% by weight of said organopolysiloxane resin.

13. A method in accordance with claim 1 wherein said organopolysiloxane is a further curable organopolysiloxane which is a hydrolysis and condensation product of at least one organosilane monomer selected from the group consisting of methyltrialkoxy silane and a mixture of methyltrialkoxysilane and phenyltrialkoxysilane in which the alkoxy group contains less than 5 carbon atoms and water at about 50 to 80° C. for a period of from about 1 to about 10 hours to form a siloxane partial condensation product which is then heated at a temperature of about 100 to 300° C. to remove alkanol by-product and water, after which the resultant product is precured by heating at a temperature below the gel point thereof and in the range of about 90 to about 185° C. to provide the precured further curable organopolysiloxane.

14. A method in accordance with claim 13 wherein said organopolysiloxane is a thermoplastic resin prior to final cure and is applied in powder form to said fibrous web to impregnate said web whereinafter the web is subjected to a pressure of about 50 to 600 p.s.i.g. and a temperature of about 150 to 250° C. for about ¼ to about 2 hours to finally cure said resin and form said impregnated sheet.

15. A method in accordance with claim 1 wherein said impregnated fibrous web is formed by impregnating said web with an organic solution of a further curable organopolysiloxane compound, said further curable organopolysiloxane compound being a precured hydrolysis and condensation product of at least one organosilane monomer selected from the group consisting of methyltrialkoxysilane and a mixture of methyltrialkoxysilane and phenyltrialkoxysilane in which the alkoxy group contains less than 5 carbon atoms and water at about 50 to 80° C. for a period of from about 1 to about 10 hours to form a siloxane partial condensation product which is then heated at a temperature of about 100 to 300° C. to remove alkanol by-product and water, after which the resultant product is precured by heating at a temperature below the gel point thereof and in the range of about 90 to about 185° C. to provide the precured, further curable organopolysiloxane, evaporating the solvent for the organopolysiloxane from said solution, and finally curing the organopolysiloxane to provide a thermoset organopolysiloxane impregnated fibrous sheet.

16. A method in accordance with claim 15 wherein said precure is effected prior to impregnation of the web.

17. A method in accordance with claim 15 wherein said precure is effected after impregnation of the web.

18. A method in accordance with claim 15 wherein said final cure is effected prior to said volatilization step.

19. A method in accordance with claim 15 wherein said final cure is effected after said volatilization step.

20. A method in accordance with claim 15 wherein said volatilization is carried out in two separate steps, the first step comprising heating the web for about 1–3 hours at about 300° C. to carbonize the organic constituents and the second step comprising heating the web for about 1–3 hours at about 500° C. to volatilize said organic constituents.

21. A method in accordance with claim 15 wherein said volatilization comprises maintaining the impregnated web at a temperature greater than about 500° C. for about 2–8 hours.

22. A method in accordance with claim 15 wherein said evaporation is carried out at from about 25 to about 185° C., said precure is carried out at a temperature from 10–20° C. below the gel point, and said final cure is carried out at a temperature of from about 80 to about 100° C. at a relative humidity of from about 50 to about 100%.

23. A product by the method of claim 1.

24. A product by the method of claim 14.

(References on following page)

References Cited

UNITED STATES PATENTS

| | | | |
|---|---|---|---|
| 2,673,823 | 3/1954 | Biefeld et al. | 117—63 |
| 3,481,763 | 12/1969 | Hider et al. | 117—21 |
| 3,597,268 | 8/1971 | Smith | 117—161 ZA |
| 3,572,417 | 3/1971 | Wismer | 264—44 |
| 2,706,190 | 4/1955 | Clark | 260—46.5 |
| 2,893,898 | 7/1959 | Evans et al. | 117—126 GS |
| 2,965,515 | 12/1960 | Jellinek | 117—126 GS |
| 3,179,534 | 4/1965 | Law | 117—126 GS |
| 3,230,289 | 1/1966 | Eder et al. | 264—216 |
| 3,231,540 | 1/1966 | Vanderbilt | 260—41.5 |
| 3,262,810 | 7/1966 | Campbell | 117—126 GS |
| 3,499,788 | 3/1970 | Glav | 117—46 CA |
| 3,385,915 | 5/1968 | Hamling | 264—.5 |
| 3,628,985 | 12/1971 | Hider et al. | 117—46 CA |

WILLIAM D. MARTIN, Primary Examiner

M. SOFOCLEOUS, Assistant Examiner

U.S. Cl. X.R.

117—46 CA, CC, 98, 126 GS, 132 BS, 135.5, 140 A, 161 ZA, 169 A, R; 264—44, 59, 63